(12) United States Patent
Weynant et al.

(10) Patent No.: US 7,121,731 B2
(45) Date of Patent: Oct. 17, 2006

(54) OPTICAL FIBER CONNECTOR ASSEMBLY

(75) Inventors: Eric Weynant, Montreal (CA); Daniel Demissy, St-Bernard de Lacolle (CA)

(73) Assignee: Le Savoir du Gardien, Inc., (CA)

( * ) Notice: Subject to any disclaimer, the term of this patent is extended or adjusted under 35 U.S.C. 154(b) by 0 days.

(21) Appl. No.: 10/522,995

(22) PCT Filed: Aug. 7, 2003

(86) PCT No.: PCT/CA03/01195

§ 371 (c)(1),
(2), (4) Date: Sep. 6, 2005

(87) PCT Pub. No.: WO2004/015473

PCT Pub. Date: Feb. 19, 2004

(65) Prior Publication Data

US 2006/0104573 A1 May 18, 2006

(30) Foreign Application Priority Data

Aug. 9, 2002 (CA) .................................. 2397280

(51) Int. Cl.
*G02B 6/36* (2006.01)
(52) U.S. Cl. ....................................................... 385/53
(58) Field of Classification Search ................. 385/53, 385/64, 62, 70, 72
See application file for complete search history.

(56) References Cited

U.S. PATENT DOCUMENTS 4,094,580 A * 6/1978 Cook et al. .................... 385/64
4,483,584 A * 11/1984 Gresty .......................... 385/64

FOREIGN PATENT DOCUMENTS

| DE | 27 54 347 C2 | | 6/1979 |
|---|---|---|---|
| DE | 198 30 358 A1 | | 1/1999 |
| EP | 104820 | * | 4/1984 |
| EP | 0 373 340 B1 | | 6/1990 |
| JP | 52-077736 | * | 6/1977 |
| JP | 01302209 A | | 12/1989 |
| JP | 03130706 | | 6/1991 |
| JP | 04 006507 | | 1/1992 |
| JP | 2001/194554 | | 7/2001 |

OTHER PUBLICATIONS

International Search Report dated Feb. 19, 2004.

* cited by examiner

*Primary Examiner*—Chau N. Nguyen
(74) *Attorney, Agent, or Firm*—Bromberg & Sunstein LLP

(57) ABSTRACT

The present invention is directed to an optical fiber (12,14) connector (10) comprising a longitudinally extending body (16), said body (16) comprising a first end (18) and a second end (20), and said body having a conduit (22) extending from said first end (18) to said second end (20), and said body (16) comprising a plurality of finger projections (24, 26) that extend longitudinally at each end of said first (18) and second ends (20), the connector assembly (10) including a first collar circumferentially coupled to said first end (18) of said connector (10) and a second collar (36) circumferentially coupled to said second end (20) of said connector (10), the connector assembly (10) comprises a connector housing of four portions (38), which, when assembled, define a connector chamber for receiving and retaining a connector (10) as aforesaid.

2 Claims, 7 Drawing Sheets

OPTICAL FIBER CONNECTOR ASSEMBLY

FIELD OF THE INVENTION

The present invention relates to the field of optical fiber connectors and particularly to a connector assembly adapted for "last mile" use.

BACKGROUND OF THE INVENTION

In the field of photonics, optical fibers are used for the transmission of optical signals as well as for the linking of optical switches, waveguide grating devices, optical amplifiers, modules and the like. Optical transmission systems relying on photonics have been taking on greater importance, as optical signals are capable of carrying far larger amounts of information as compared to typical copper wire communication systems. For example, with the technology of Dense Wavelength Division Multiplexing (DWDM) and Demultiplexing it is possible to transmit multiple wavelengths in a single fiber, providing data capacities of 40 Gigabits per second and greater.

Optical networks which require DWDM equipment and other such devices demand multiple amounts of splicers and connectors. Splicing and connecting play a significant role in network cost and performance. Although mechanical splicing of optical fibers may be sufficient where there is no requirement for frequent connection and disconnection, connectors will be used in applications where flexibility for routing or reconfiguration is necessary or for connection of an end use device, such as a computer or other electronic device to a fiber or to other such devices. Current technologies for connectors or for splicing are time consuming and expensive, since they are difficult to miniaturize and to manipulate.

As poor connection between the ends of two optical fibers will lead to signal distortion and loss of strength, a number of approaches have been proposed for proper optical fiber connection which will provide a good signal conduction. One such approach is set out in our U.S. patent application No. 60/358,392, filed Feb. 22, 2002, titled "A Connector for Optic Fibers". This application is incorporated herein by reference in its entirety.

In our aforesaid application, we propose a connector for connecting the ends of two optical fibers by abutment, wherein the connector is divided into a plurality of fingers that extend longitudinally at each end and a fiber conduit extending from the first end to the second end. Such a connector is manufactured of a shape memory material such as polymer or a metal alloy. In general, such materials when deformed from a rest condition by any suitable means, such as by the application of heat, will then be biased to return to a rest condition when the cause of deformation is removed. As set out in our aforementioned application, an example of such a material is any material that deforms within its elastic limit under mechanical deformation. Another example would be any material that expands suitably due to a temperature increase, and then returns to its initial rest condition when the temperature is reduced to the initial temperature An example of such an above material would be a shape memory alloy (SMA). Examples concerning activation of the shape memory element in a SMA include D. E. Muntges et. al., Proceedings of SPIE volume 4327 (2001), pages 193-200 and Byong-Ho Park et. al., Proceedings of SPIE volume 4327 (2001), pages 79-87. Miniaturized components, of SMA may be manufactured by laser radiation processing. See for example H. Haferkamp et. al., Laser Zentrum Hannover e.v., Hannover, Germany. All of the above references are incorporated herein by reference.

To connect the ends of two optical fibers using our connector, the connector must be first deformed in any, suitable way, such as by heat or the application of a compressive force along its longitudinal access. For example, the connector may be heated to a sufficient temperature so that the conduit through the connector for passage of the optical fiber ends is enlarged, sufficiently to permit passage of the ends of the optical fibers. In this condition, the ends of the optical fibers are inserted into the conduit. An optical gel may also be applied, which would be substantially of the same index of refraction as the optical fibers to assure uniform optical properties across the connection between the fibers.

Once the optical fibers ends are fully inserted into the connector, and the respective ends abut, the connector may then be cooled and allowed to return to an initial size. On cooling, the connector will then tend to exert a controlled compressive force on the optic fibers strong enough to retain the optic fibers in an abutment position but small enough not to damage the optic fibers by compression.

SMA technology is particularly suited to optical fiber connection, as it offers mechanical precision in the order of +/−0.01 micron, which is 400 times more precise than current connector technology.

Use of such an optical fiber connector as described above is however not totally satisfactory as during the step of cooling the connector to allow it to return to its rest condition, there may be a tendency for the connector to push the ends of the optical fibers apart slightly. This makes it necessary during the operation of connecting optical fiber ends to include an additional step of restraining the optical fibers in a fixed position during the step where the connector returns to its original size, to prevent the optic fibers from being moved apart on the cooling of the connector. Accordingly, some form of fixed clamping is required, of the sheath that typically covers and protects an optical fiber or bundle of such fibers to prevent axial movement of the optic fibers being connected.

Such a step is cumbersome to the easy and quick connection of optical fibers using an aforesaid connector. This typically requires the use of certain operational skill by a technician that is carrying out the operation and is a hindrance to the quick and easy connection of optical fibers, to be used in any context where fibers are to be connected, including and in particular, in the context of a "last mile" connection where incoming fibers from an optical network are to be connected to an end use device, such as in a home, office, workplace and like environment.

An example of a detachable/demountable connector for coupling optical fibers is described in EP 373 340 to Rott et al. In order to connect the fibers, the end portion of each fiber is fitted into a connector element that has a bush that encloses three short rods of circular cross section. The connector element is also comprised of a cage and a clamp. These rods form a centralizing device for the end of the wave-guide. Each half of the coupling has an outer bush that receives the inner bush of each connector element. The coupling aligns the fibers with one another. Furthermore, the transition from the "connection stage" to the "connected stage" is achieved by axial interlocking. However, this connector is cumbersome and difficult to use and does not allow for easy connection of optical fibers being connected since it comprises multiple pieces, such as a bush, a cage and a clamp.

Accordingly, although a SMA connector as described in our U.S. patent application No. 60/358,392 provides an improved means for connecting optical fibers, there is a continuing need for an optical fiber connector assembly that is simple and quick to install and use, and to maintain good signal conduction between optical fibers, and to be used in any context where fibers of an optical network are to be connected, including, and in particular for a connection to be made and provided at the end use location.

SUMMARY OF THE INVENTION

In one aspect, the present invention is directed to a connector assembly for the connection of optical fibers, in association with a connector comprising a longitudinally extending body, said body comprising a first end and a second end, and said body having a conduit extending from said first end to said second end, and said body comprising a plurality of finger projections that extend longitudinally at each end of said first and second ends. The connector assembly includes a first collar circumferentially coupled to said end of said connector and a second collar circumferentially coupled to said second end of said connector. The connector assembly comprises a connector housing of four portions, which, when assembled, define a connector chamber for receiving and retaining a connector as aforesaid, when coupled with a collar. The four portions of the connector assembly are configured to exert a tractional force on the connector and connector collar when they are positioned in the connector chamber, by axial rotation of a first part of the connector housing relative to a second part. By the application of such tractional force on the connector, when positioned in the connector assembly, the conduit of the connector, due to amorphous phase deformation, is enlarged sufficiently, as a result of and to the extent of the amorphous and elastic capacity of deformation of the connector, in diameter to permit the entry of optical fibers to be connected. By the opposite axial rotation of the connector housing ends, there is a reduction of tractional force, permitting the collar and connector to return to a rest position, securing, by elastic capacity, the optical fibers and abutment of the ends of the optical fibers for transmission of optical signals.

In another aspect, the present invention is directed to the use of a connector assembly as aforesaid for the connection of optical fibers within an optical transmission system, linking of optical switches, waveguide grating devices, optical applications, modules and the like, and in "last mile" connection of optical fiber to an end use device.

DESCRIPTION OF THE DRAWINGS

Reference will now be made by way of example to the accompanied drawings, showing articles made according to preferred embodiments of the present invention. In the drawings.

DESCRIPTION OF THE PREFERRED EMBODIMENT

Figure 1A:
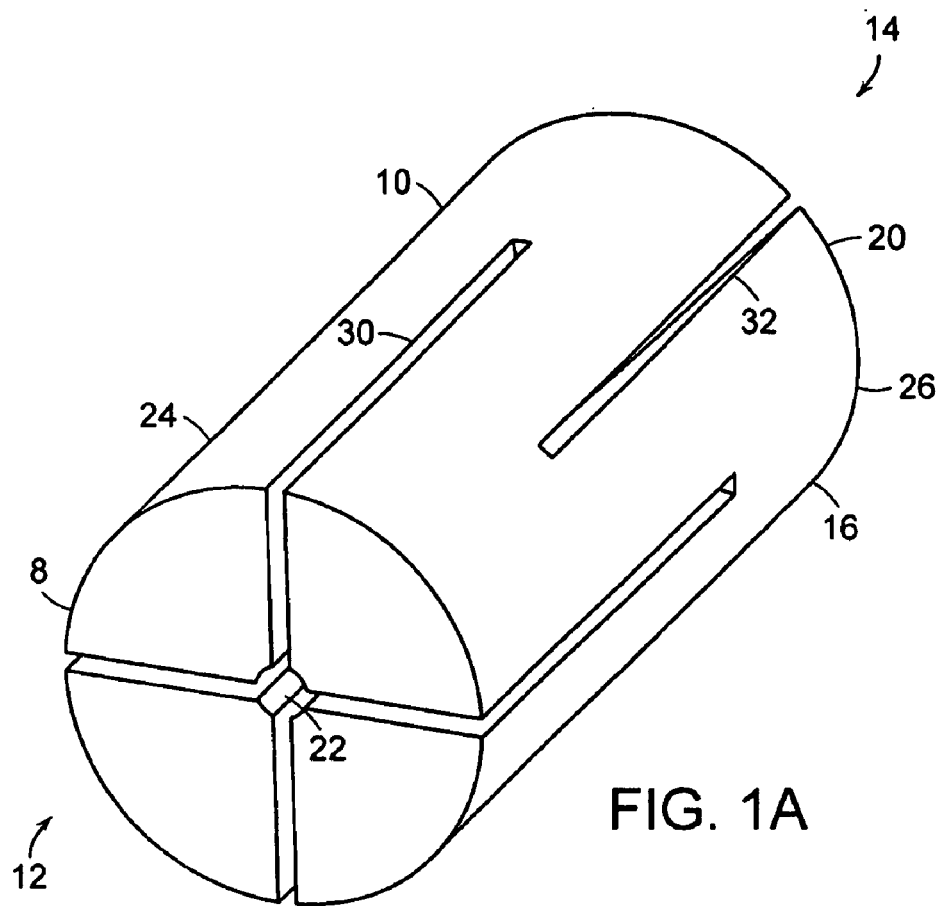
FIG. 1 is a perspective view of the connector in accordance with the present invention.
Figure 1B:
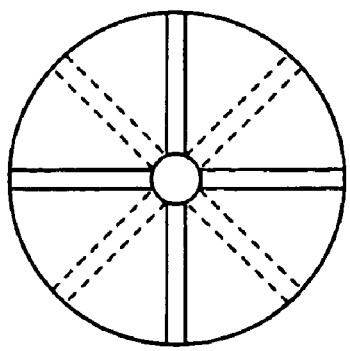
Figure 1C:
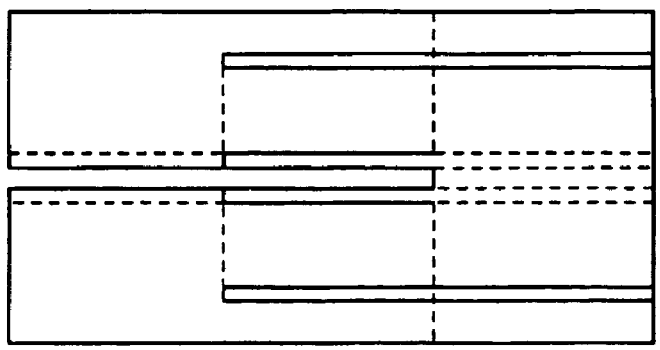

By reference to FIG. 1, is shown a connector 10 for use in an assembly in accordance with the present invention. Connector 10 may be used to connect the ends of a first optical fiber 12 and a second optical fiber 14 for optical signal transmission. Connector 10 has a connector body 16 which may be generally cylindrical. Connector body 16 has a generally first end 18 and a generally second end 20.

Connector body 16 also comprises a pass through conduit 22 which extends from first end 18 to the second end 20. The optical fibers 12 and 14 may be passed through the conduit 22 and secured therein, in abutment of the ends of the fibers, for optical signal transmission. Conduit 22 is configured and sized such that connector 10 applies a sufficient compressive force on optical fibers 12 and 14 to hold the fibers in abutment with each other, when the fibers are positioned in conduit 22. It will be understood that the compressive force must be sufficient to restrain the optical fibers and maintain them in abutment, without exerting excessive force which would cause damage or breakage of the optical fibers to interfere with transmission of optical signals.

Connector 10 is also comprised of a plurality of first fingers 24 and that extend from first end 18 towards second end 20 and a plurality of second fingers 26 which extend from second end 20 towards first end 18. The first fingers 24 hold the first optic fiber 12 in position in the connector 10, when the optic fiber 12 is inserted into the connector. By configuring the first fingers 24 and second fingers 26 to have a selected length, the compressive force of the connector on the optic fibers 12 and 14 can be controlled and can be varied over the length of the connector body 16. Second fingers 26 will function likewise as fingers 24, to hold second optical fiber 14. The connector body 16 may be divided into any suitable number of first fingers 24 and second fingers 26. Alternatively, the connector may have a greater or lesser number of first and second fingers. The first and second fingers may occupy any suitable portion of the circumference of body 16. For example, the first fingers 24 may each occupy approximately 90 degrees of the circumference. The fingers may be formed by any suitable method such as by milling axially-extending slots 30 into the first end 18 and axially-extending slots 32 into second end 20. It will be appreciated that the size and number of second fingers may vary from the size and number of the first fingers. For example, the second fingers may be similar in size, length and number to the first fingers. Alternatively, the second fingers may be configured differently than the first fingers, to suit the mechanical properties of the second optical fiber. For example, the second fingers may be shorter or longer than the first fingers or may be different in number than the first fingers.

The first and second fingers may be circumferentially offset from each other at any suitable offset angle, such as, for example, 45 degrees.

Additionally, the first and second fingers may extend along the connector body far enough from the respective ends so that they overlap with each other along a portion of the connector body; the overlap permitting further control over the compressive force exerted by the connector body on the optical fibers and particularly at the point where the first and second optical fibers abut.

Connector 10 may be made from any suitable material that has the property of shape memory. Materials that have the property of shape memory are materials that when deformed from their rest condition by any suitable means, are biased to return to a rest condition when the cause of deformation is removed. For example, such a material may be any material that deforms within the elastic limits of the material under mechanical deformation and tends to or returns to an initial rest condition when the mechanical force is no longer applied. A further example would be any material that expands due to an increase in temperature and then tends to or returns to an initial rest condition when the temperature is reduced.

Connector 10 may be manufactured from any of several suitable materials including SMA, depending on the particular environment in which the connector is to be used and depending on the particular governing jurisdictional codes concerning construction and use of connectors in association with the propagation and transmission of optical signals.

Connector 10 may for example be manufactured from polymeric materials such as isostatic 1 polybutene, piezoelectric ceramics, copper alloys including binary and ternary alloys, such as Copper-Aluminum alloys, Copper-Zinc alloys, Copper-Aluminum-Beryllium alloys, Copper-Aluminum-Zinc alloys and Copper-Aluminum-Nickel alloys, Nickel alloys such as Nickel-Titanium-Iron alloys and Nickel-Titanium-Cobalt alloys, Iron alloys such as Iron-Manganese alloys, Iron-manganese-Silicon alloys, Iron-Chromium-Manganese alloys and Iron-Chromium-Silicon alloys, Aluminum alloys, and high elasticity composites which may optionally have metallic or polymeric reinforcement.

Figure 2:
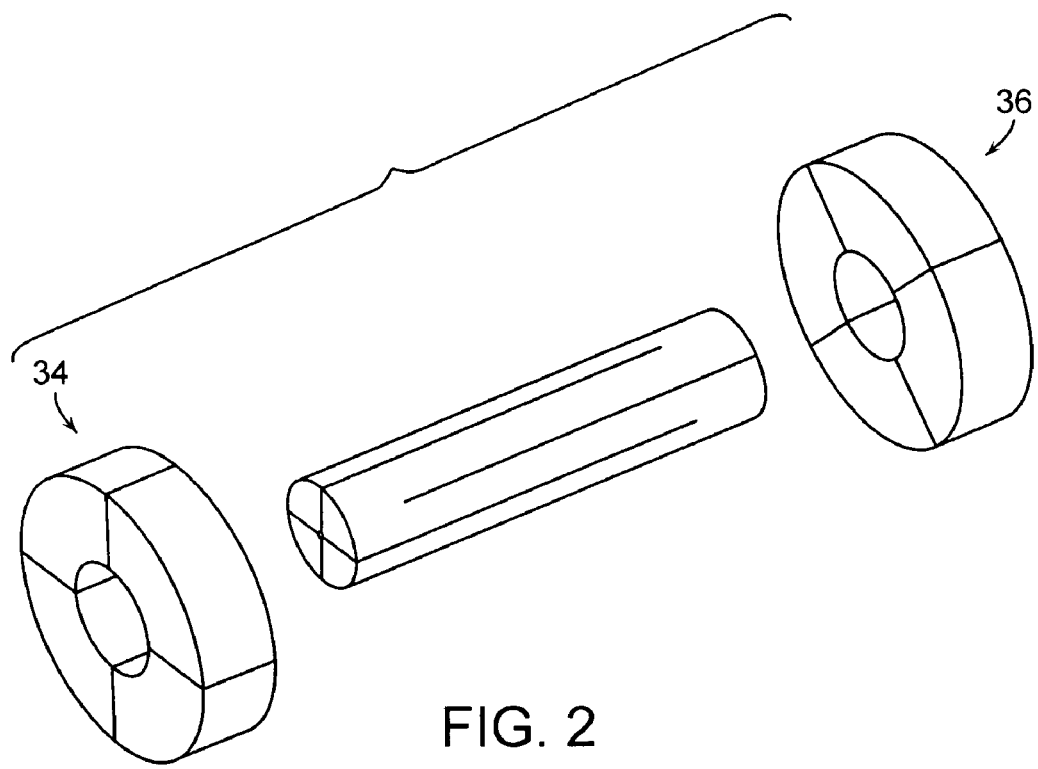
FIG. 2 is an expanded perspective view of the connector shown in FIG. 1 with collars.
Figure 3:
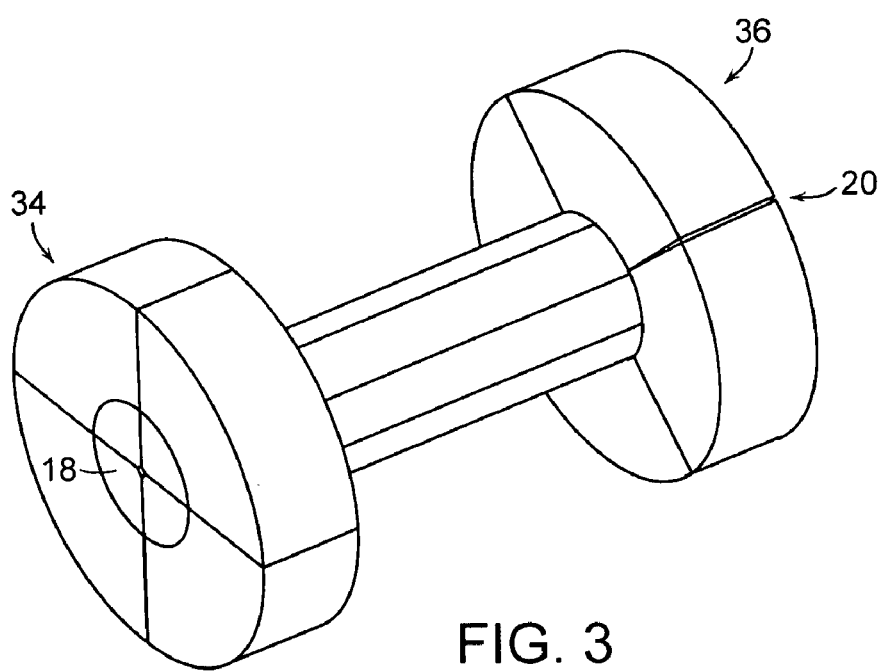
FIG. 3 is a perspective view of a connector with collars.
Figure 5:
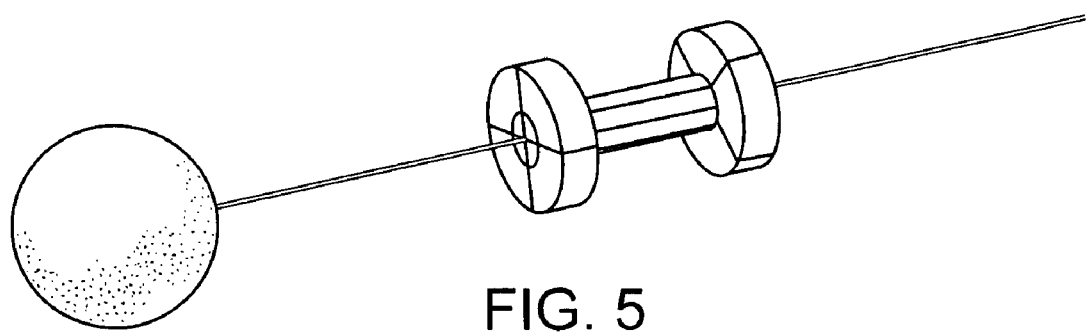
FIG. 5 is a further perspective view of a connector with collar and fiber through the connector conduit.

For the purpose of assembly, the present connector assembly also comprises annular collars or rings for circumferential placement at the first and second ends of the connector of suitable strength, such as copper. Referring to FIG. 2, FIG. 3 and FIG. 5, circumferential collars 34 and 36 are placed at ends 18 and 20 respectively. The collars are secured to the ends of the connectors by any suitable means, for example, including by glue, resin or adhesive.

Figure 4:
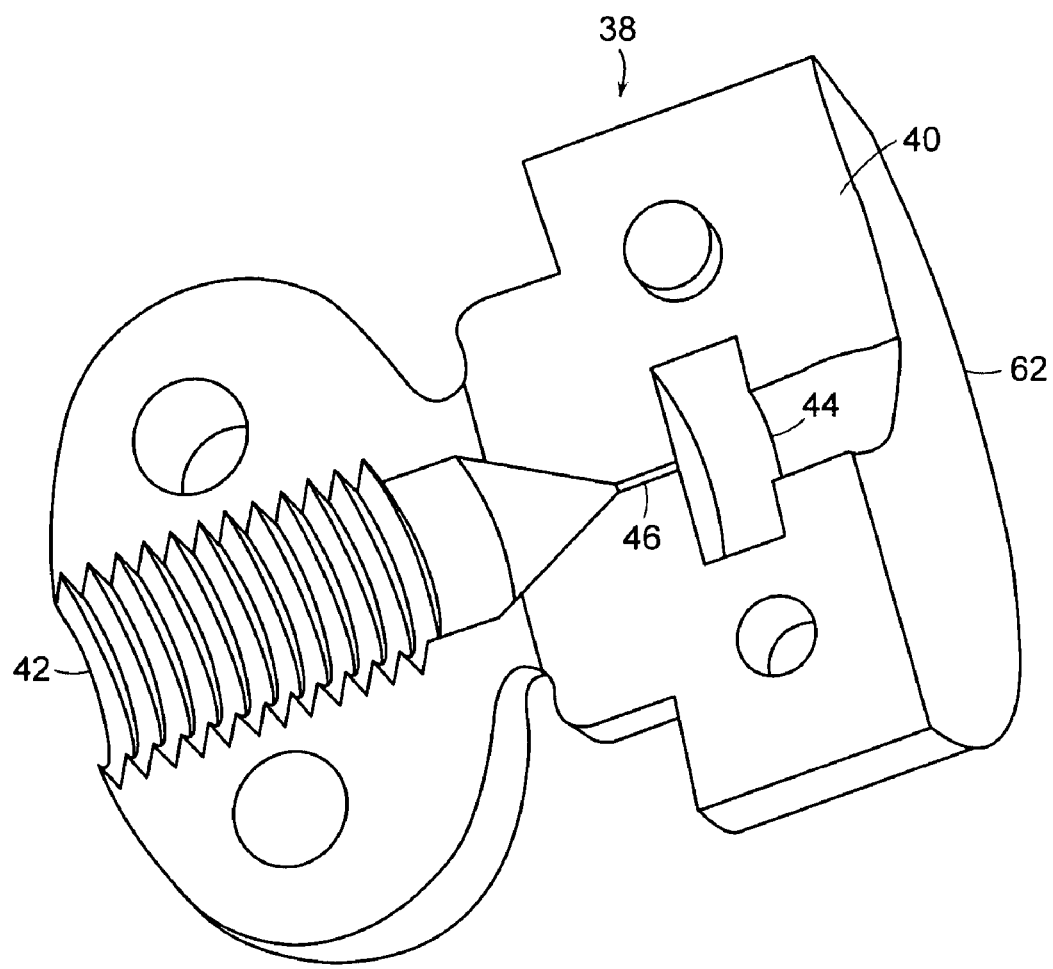
FIG. 4 is a perspective view of a connector housing portion in accordance with the present invention.

The connector with collars is then mounted into a connector chamber of a connector housing of the invention of the present assembly. The connector housing is made up of four quarter portions, which in a preferred embodiment of the present invention are identical in configuration. Referring to FIG. 4, each quarter portion 38 of the connector housing comprises an abutment face 40, an aperture recess 42 and a connector chamber recess 44. Additionally, there is also a fiber pass through recess 46. All of the aforesaid elements are configured such that when the quarter portions are assembled to form a complete connector housing, the recesses 42 form an aperture for entry of optical fiber and optical fiber cable. Recesses 44 will configure a connector chamber for holding of the connector with collars and recess 46 will define a fiber pass through conduit for passage of an optical fiber from the aperture to the connector.

Figure 6:
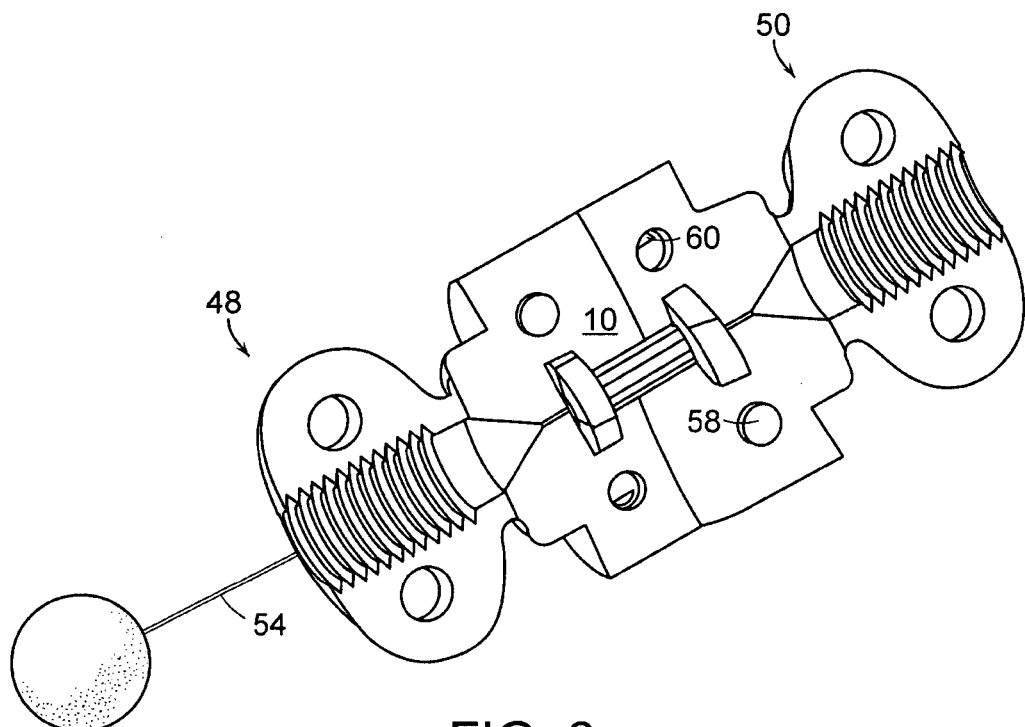
FIG. 6 is a sectional perspective view of a connector assembly in accordance with the present invention.
Figure 7:
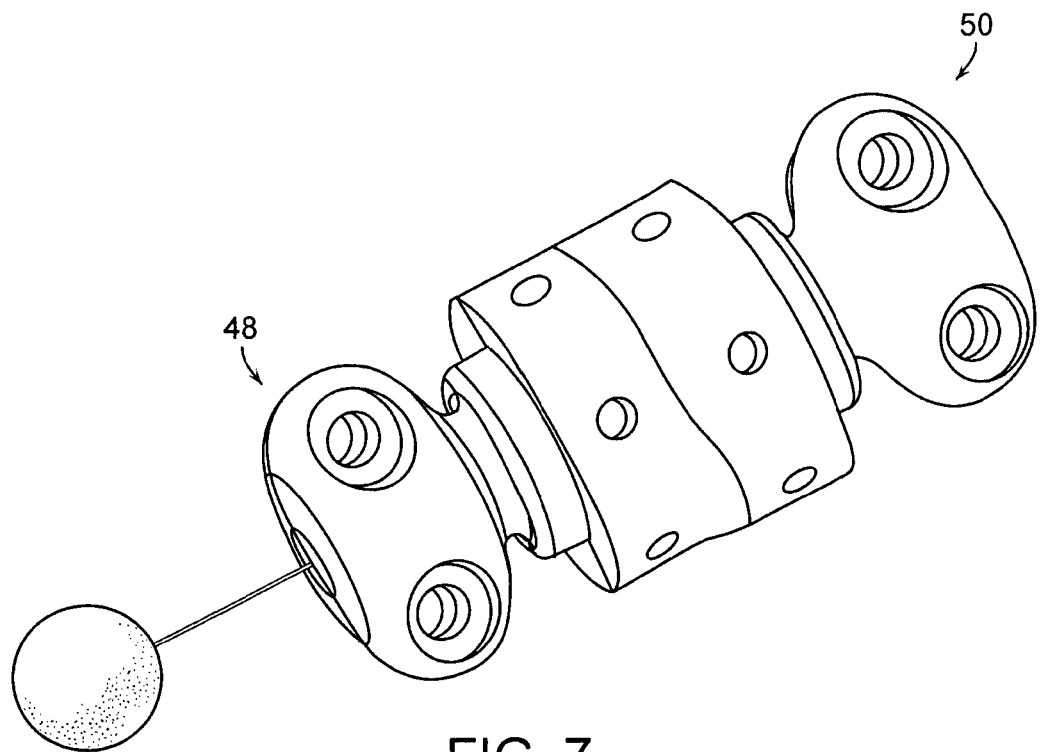
FIG. 7 is a perspective view of a connector assembly in accordance with the present invention.

Referring to FIGS. 6 and 7, in assembling the connector housing with the connector, the connector is placed within the connector housing chamber recesses and securing therein by securement of the four portions of the connector housing. Two of the aforesaid portions when fastened to each other will define a first end 48 of the connector housing and the other two portions will define a second end 50 of the connector housing. The portions defining each end of the connector housing may be securing to each other by appropriate securing means, for example screws 52 or fasteners.

A first needle 54 of slightly larger diameter as compared to the optical fiber is inserted through the aperture pass through conduit, and connector conduit from the first end of the connector housing, A second needle 56 is likewise passed through at the second end of the connector housing of the present assembly. The needle will be of manufacture of a suitable metal such as steel and of a diameter dimension such as when it is passed in the above fashion, it will cause a very slight radial expansion in the diameter of the connector conduit by very slight displacement of the fingers on the connector body.

Figure 8:
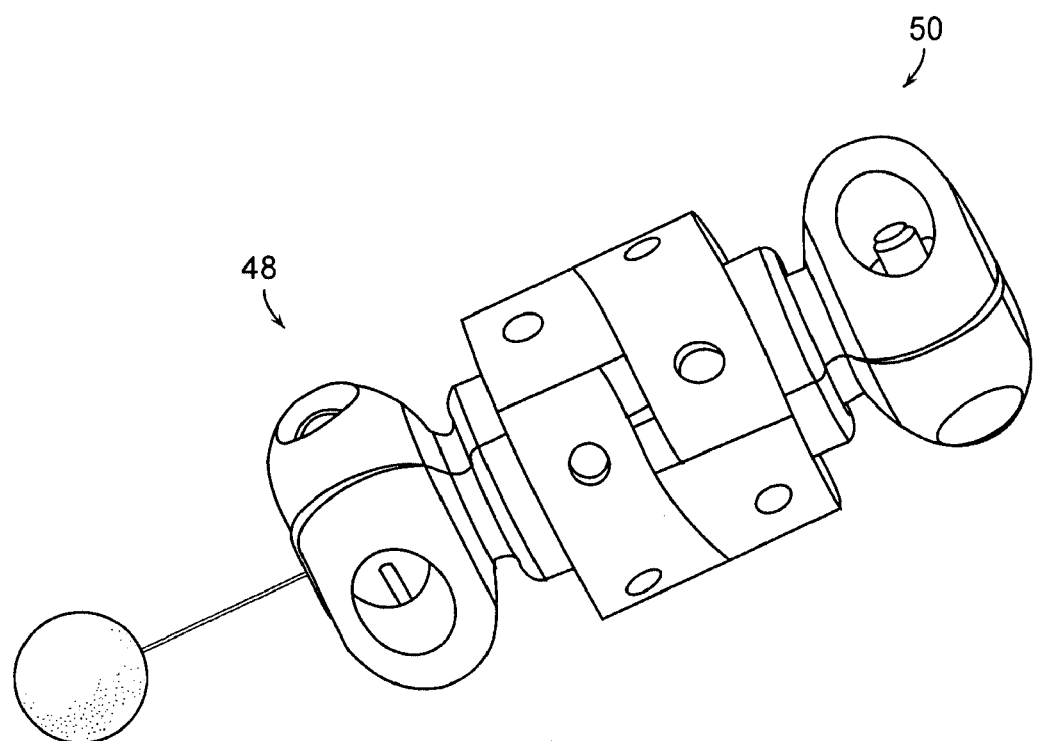
FIG. 8 is a perspective view of a connector assembly in accordance with the present invention, when tractional force is applied on the connector.

Each connector housing quarter portion comprises a slightly ramped or spiraled abutment footing 62. Referring to FIGS. 7 and 8, when two portions are coupled to form an end of the connector housing, they form an end of the connector housing which, when rotated, as shown in FIG. 8, due to the ramped footing 62, will cause a slight rotational action on the connector and collar positioned in the connector chamber. The portions are configured so that on rotation the tendency to reverse the rotational displacement is resisted. This may be by etching or teeth on the abutment footings for gripping or engagement to prevent reverse rotation when the rotational force is removed. Each abutment face may also include a peg 58 and complimentary peg hole 60, for further securing and aligning the portions. In practice, each end of the connector chamber will therefore function as follows:

After insertion of the needles as aforesaid, each end of the connector housing will be given a slight opposite axial rotation and as a result of the ramped or spiral surface, an axial traction movement will be applied to the collars of the connector. Such rotation of the connector housing ends will cause the exertion of a tractional or slight stretching force on the connector. As a result of and to the extent of the amorphous and elastic capacity of deformation of the connector material, the tractional deformation of the connector will cause not only elongation of the connector but also induce stress on the connector, so that the amorphous point will be reached, retaining the connector diameter slightly larger than the diameter of the needle due to the deformation in the amorphous phase. Thus, when the needle is removed, the connector diameter will stay at or slightly greater than the diameter of the needle.

For connection of optical fibers, the first needle is removed and an optical fiber with fiber optic cable is then inserted through the aperture of the first end, and the fiber through the fiber pass through and into the conduit of the connector.

The optical fiber will typically be encased in a protective sheath, which sheath, on insertion in the aperture may be gripped and held in position by the aperture 42 wall which may be suitably configured, for example by grooves or serrations, for such purpose.

For connection with a second optical fiber, the needle is removed from the second end of the connector assembly and a second optical fiber with fiber sheath cable is inserted through the second end aperture, and the fiber through the pass through conduit and into the connector conduit. The optical fiber is thus brought into abutment with the optical fiber inserted from the opposite end. Again, the sheath of the second cable will be held in position within the aperture. Subsequently, for connection, the first and second ends of the connector housing are radially and oppositely rotated, one relative to the other, to cause a reversal in the axial rotation. This causes a reduction in the tractional force exerted on the connector. This reduction of tractional force causes the connector conduit to reduce in diameter by passing the amorphous state to elastic state and induce a slight movement of the connector body fingers, simultaneously from the first end and second end of the connector, which grips the optical fibers. Because of the reduction in stretching longitudinally, this will bring the tips of the optical fibers into firm abutment. As well, by reduction of the conduit diameter, the two optical fibers will be constrained and secured in abutment position. Further, the aperture wall, which may be serrated or otherwise configured to securely grip the cable sheath, will push the fiber ends against each other, the aperture space allowing the optical fiber to bend slightly, thus preventing or restricting play, slippage or breakage in the optical fibers to be coupled, assuring proper abutment for transmission.

Figure 9:
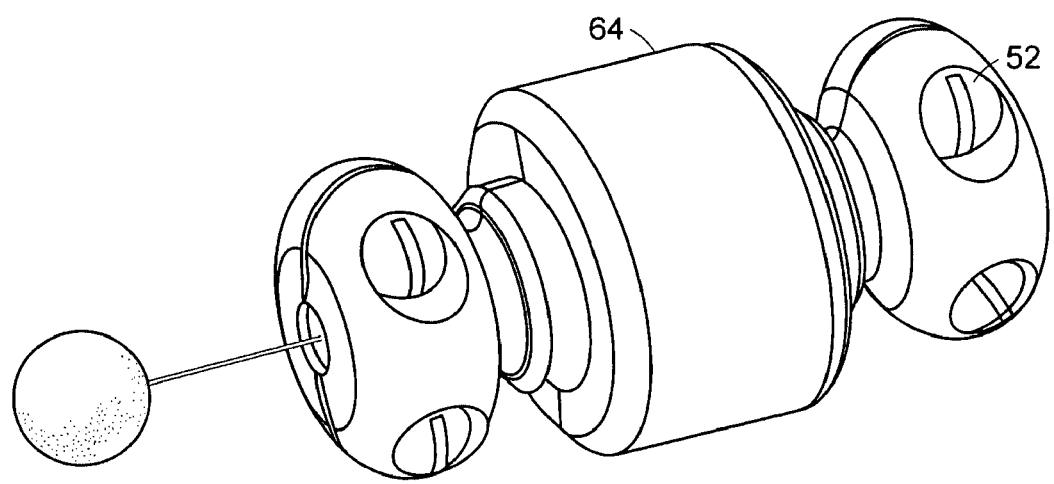
FIG. 9 is a perspective view of a connector assembly with sheathing, in accordance with the present invention.

As set out in FIG. 9, the completed assembly with connected optical fibers may be further covered by a sheath or envelope to assist in the prevention of entry of dust and other contaminating materials or particles.

Figure 10:
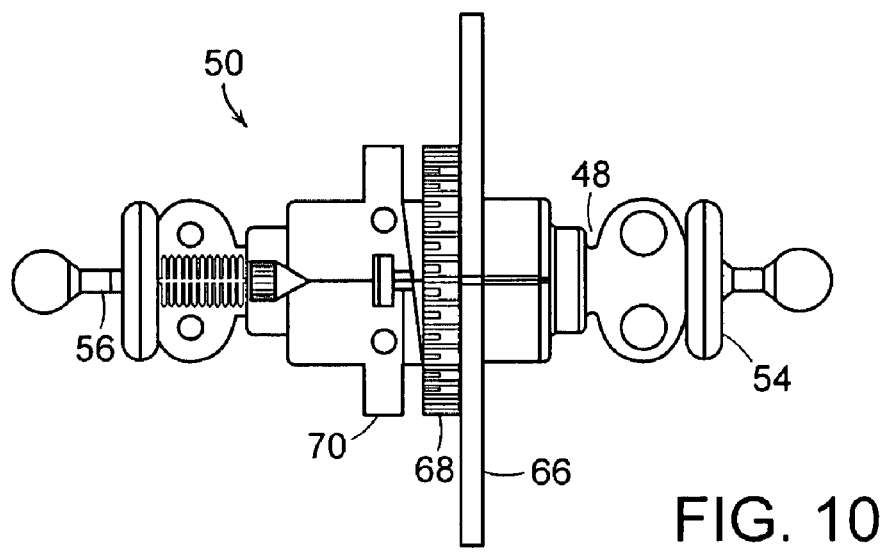
FIG. 10 is a side elevation view of a connector assembly according to one embodiment of the present invention.
Figure 11:
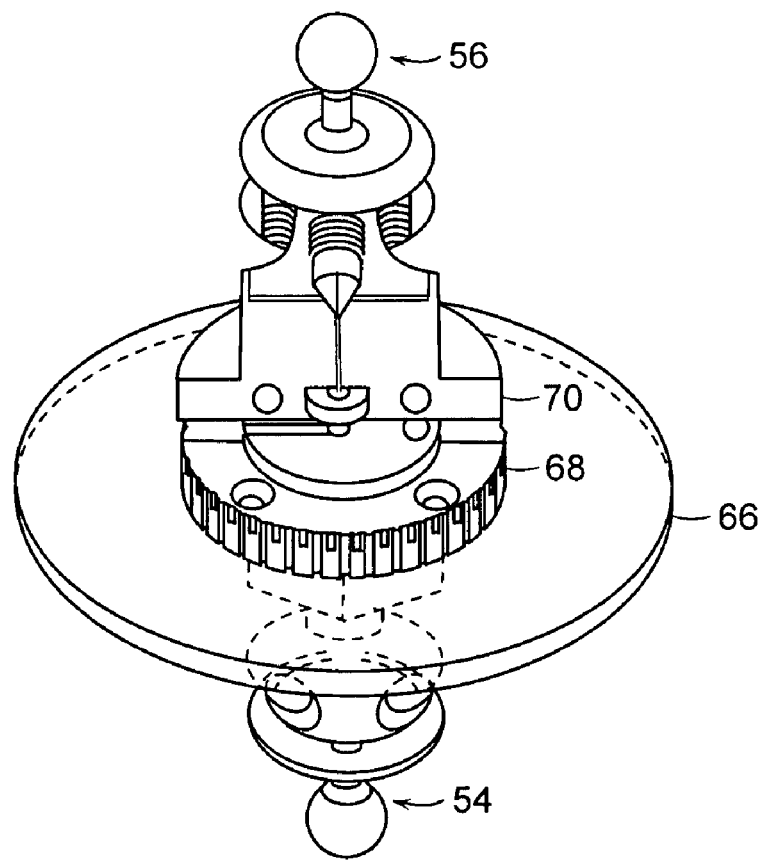
FIG. 11 is a perspective view of a connector assembly according to one embodiment of the present invention.
Figure 12:
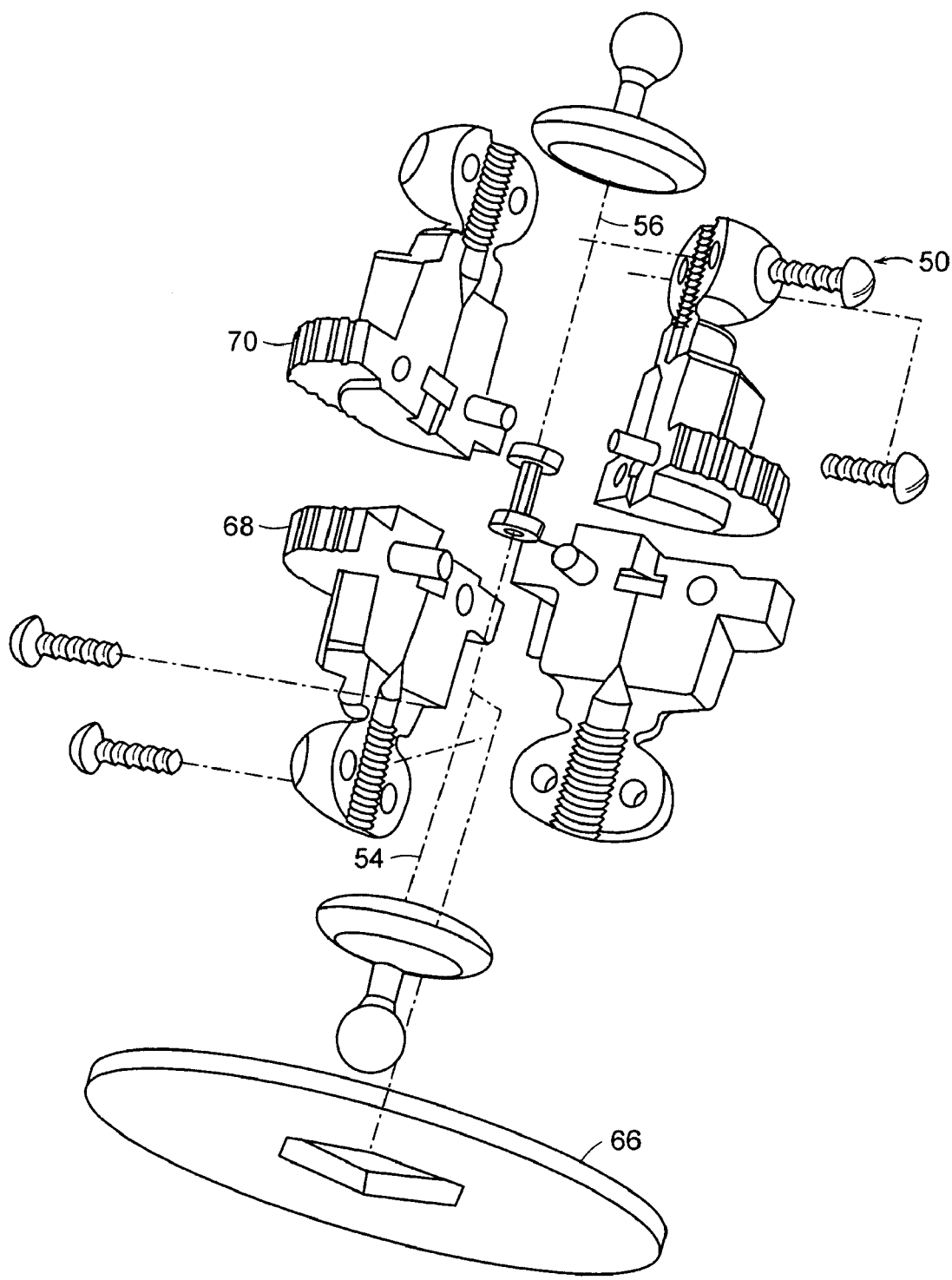
FIG. 12 is an expanded view of a connector assembly according to one embodiment of the present invention.

Referring to FIGS. 10, 11 and 12, a particular use of the connector housing of the present invention is for the connection of optical fibers at the end of the "last mile", wherein an optical fiber emanating from an optical fiber network is connected to an end use device. For example, this may be in a residence or office environment. A connector housing of the present invention is imminently suited for the completion of a simple connection in such an environment. Connector housings of the present invention may be positioned in suitable locations in a wall 66 of a house or work environment, during construction of the building in question or afterwards by a retrofit operation. The connector housing may include first flange grip 68 and second flange grip 70 on the first and second ends respectively of the connector housing for assembly on a wall. In such applications, the first end of the connector housing would abut and protrude from the room wall as shown in FIGS. 10 and 11. In assembly, the pin would be removed from the first end and an incoming optical fiber, from an optical network, would be inserted, according to the operations described above. A pin, as aforesaid, would be retained in the second end of the connector housing, namely the end protruding in the room. Such connector housing would be in position with tortional forces being retained. At the time of connection with the end use device, the second pin would again be removed according to the operations as described previously, the second optical fiber connected to the device for use, would be passed through the second end of the connector assembly and the room end of the connector assembly would be axially rotated again as described aforesaid to remove the tortional force, for connection. Rotation may be effected by rotation of the flange grip and wall plate means. In this manner, a connection would be completed and the end use device would be connected in such manner to receive an optical signal from the optical network and thus would be ready for operation.

As will be appreciated by the skilled person to whom the present specification is addressed, the above descriptions constitute preferred embodiments, and the present invention is susceptible to modification and change without departing from the fair meaning of the accompanying claims.

The invention claimed is:

1. A connector assembly for connecting optical fibers comprising:
   (a) a connector (10) comprising material having shape memory property, comprising a longitudinally extending body (16), said body (16) comprising a first end (18) and a second end (20), and said body(16) having a conduit (22) extending from said first end (18) to said second end (20), and said body (16) comprising a plurality of finger (24) (26) projections that extend longitudinally at each of said first and second ends (18) (20);
   (b) a first collar (34) circumferentially coupled to said first end (18) of said connector (10) and a second collar (36) circumferentially coupled to said second end (20) of said connector (10);
   (c) a connector housing comprising four quarter portions (38), and defining a connector chamber for receiving said connector when coupled with said collars (34) (36), said quarter portions configured such that two of the quarter portions (38) when assembled comprise a first end (48) and other two of the quarter portions when assembled comprise a second end (50) of said connector housing and further configured to exert tractional force on said connector (10) when said connector (10) is positioned in the connector chamber, by axial rotation of said first end (48) relative to said second end (50) of said connector housing, each of said connector housing ends comprising an aperture and pass through conduit between said aperture and said connector chamber; and
   (d) a needle (54) capable of insertion through said aperture, pass through conduit and connector conduit, and capable of expansion of the radial diameter of said connector conduit when inserted there through.

2. The use of said connector assembly of claim 1, for connecting optical fibers comprising:
   (a) the insertion of the needle (54) through the aperture, pass through conduit and connector conduit (22) to cause a radial expansion of the diameter of the connector conduit, the opposite axial rotation of the first end (48) of the connector housing relative to the second end (50) of the connector housing, which by rotational action will exert a tractional force on the connector (10), sufficient to deform the connector (10) according to the elastic properties of the connector (10), render the connector to its amorphous phase by the stress induced on the connector (10) and cause radial expansion of the connector diameter thereby;
   (b) removal of the needle (54);
   (c) the passing of a first optical fiber (12) through one of said apertures, pass through conduit and first end (18) of the connector and passing of a second optical fiber (14) through the other one of said apertures and pass through conduit and through the second end (20) of the connector to abut the end of the first optical fiber (12); and
   (d) the opposite axial rotation of the ends of the connector housing to relieve the tractional force on the connector and reduce the diameter of the connector conduit by passing from the amorphous state to the elastic state, securing the optical fibers (12) (14) and abutment of the end of one optical fiber (12) to the other (14).

* * * * *